United States Patent [19]
Irie

[11] Patent Number: 6,075,946
[45] Date of Patent: Jun. 13, 2000

[54] POSITION ADJUSTING DEVICE FOR A CAMERA OPTICAL UNIT

[75] Inventor: Hideyuki Irie, Tokyo, Japan

[73] Assignee: Asahi Kogaku Kogyo Kabushiki Kaisha, Tokyo, Japan

[21] Appl. No.: 09/213,865

[22] Filed: Dec. 17, 1998

[30] Foreign Application Priority Data

Dec. 18, 1997 [JP] Japan .................................... 9-349226

[51] Int. Cl.[7] .................................................. G03B 13/20
[52] U.S. Cl. .............................................. 396/90; 396/139
[58] Field of Search ................................. 396/63, 65, 72, 396/89, 90, 111, 144, 439, 535, 138–143

[56] References Cited

U.S. PATENT DOCUMENTS 5,860,031   1/1999   Oono et al. ................................ 396/85

*Primary Examiner*—Howard B. Blankenship
*Assistant Examiner*—J. K. Han
*Attorney, Agent, or Firm*—Greenblum & Bernstein, P.L.C.

[57] ABSTRACT

A position adjusting device for a camera optical unit includes a casing which is fixed within a camera for accommodating the optical unit therein, first and second supports provided between the casing and the optical unit for vertically and laterally pivotal movement of the optical unit with respect to the casing, a one-piece plate spring member having an integral laterally pressing piece for biasing the optical unit laterally and have an integral vertically pressing piece for biasing the optical unit vertically, and a pair of adjusting threads, threadingly engaged with the casing, for regulating vertical and lateral position of the optical unit against biasing forces of the vertically and laterally pressing pieces.

7 Claims, 3 Drawing Sheets

POSITION ADJUSTING DEVICE FOR A CAMERA OPTICAL UNIT

BACKGROUND OF THE INVENTION

1. Field of the Invention

The present invention relates to a device for adjusting positions of an optical unit within a camera casing.

2. Description of the Related Art

Prior to fixing an AF ranging unit of a passive type to a compact camera body, the AF ranging unit is inserted into a casing to be fixed to a camera body, and then adjustingly positioned in up, down, left and right directions with respect to an optical axis with an adjusting device under a condition in which the casing is fixed to the camera body. The adjusting device requires many parts and is large in sized.

SUMMARY OF THE INVENTION

It is an object of the invention to provide a position adjusting device for a camera optical unit which is compact and assembled with less number of component parts.

A position adjusting device for a camera optical unit comprises a casing which is fixed within a camera for accommodating the optical unit therein, first and second supports provided between the casing and the optical unit for vertically and laterally pivotal movement of the optical unit with respect to the casing, a one-piece plate spring member having an integral laterally pressing piece for biasing the optical unit laterally and have an integral vertically pressing piece for biasing the optical unit vertically, and a pair of adjusting threads, threadingly engaged with the casing, for regulating vertical and lateral position of the optical unit against biasing forces of the vertically and laterally pressing pieces.

It is desirable that elastic shielding members are interposed in a clearance between the casing and the optical unit. Since these shielding members are provided between first and second supports, adjusting operations in vertical and lateral directions does not adversely affect on the shielding property.

The plate spring member has, for example, a base part positioned on a bottom wall of the casing, the vertically pressing pieces, extending laterally from the base part, for biasing the optical unit vertically, and the laterally pressing piece, extending vertically from the base part, for biasing the optical unit laterally.

As the optical unit to which the present invention is applied, there may be an AF ranging unit of a passive type, a finder block or the like.

The present disclosure relates to the subject matter contained in Japanese patent application No. Hei. 9-349226 (filed on Dec. 18, 1997) which is expressly incorporated herein by reference in its entirely.

DETAILED DESCRIPTION OF THE PREFERRED EMBODIMENTS

Figure 1:
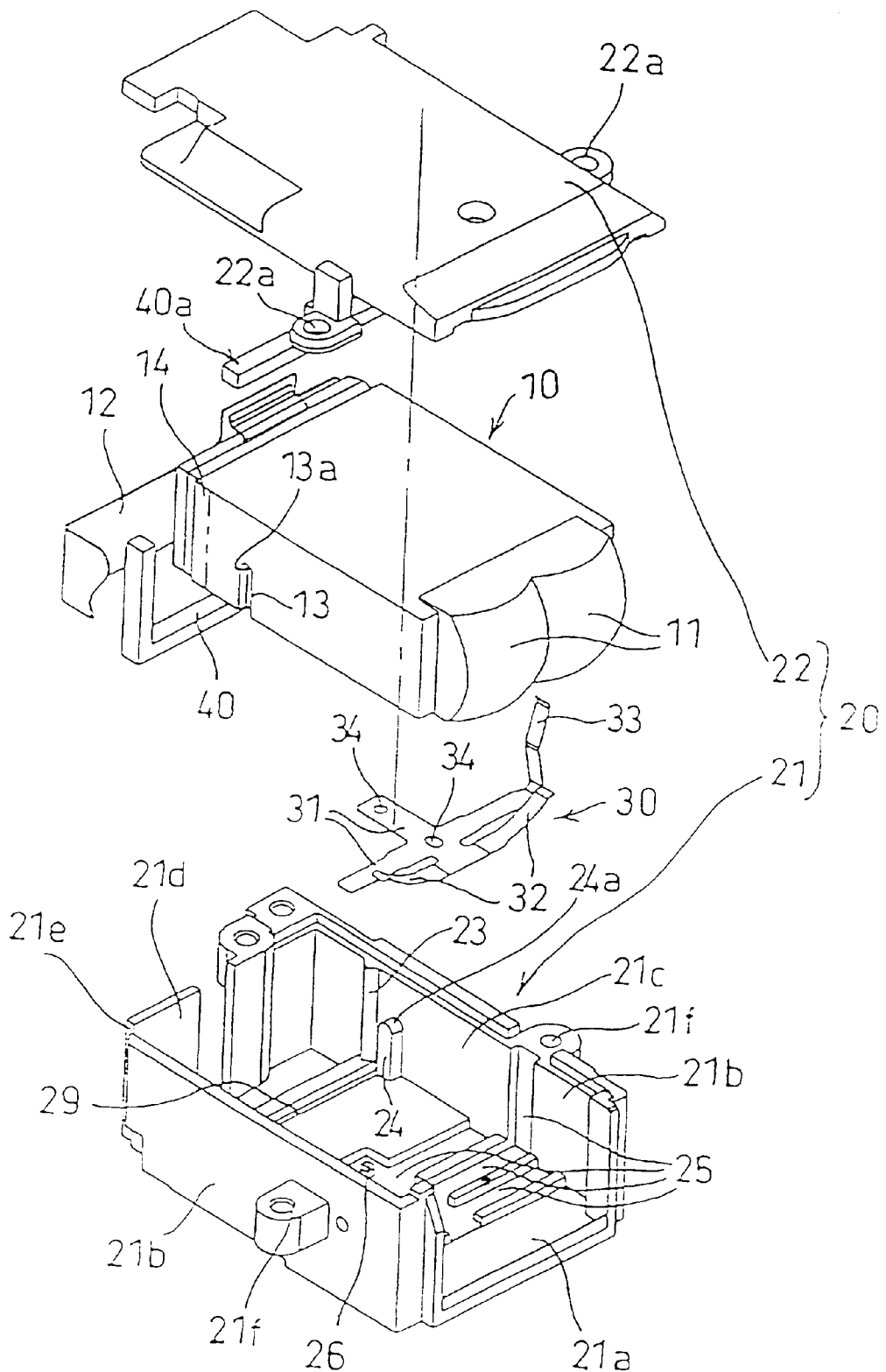
FIG. 1 is an exploded perspective view showing a position adjusting device for an optical unit of a camera.
Figure 2:
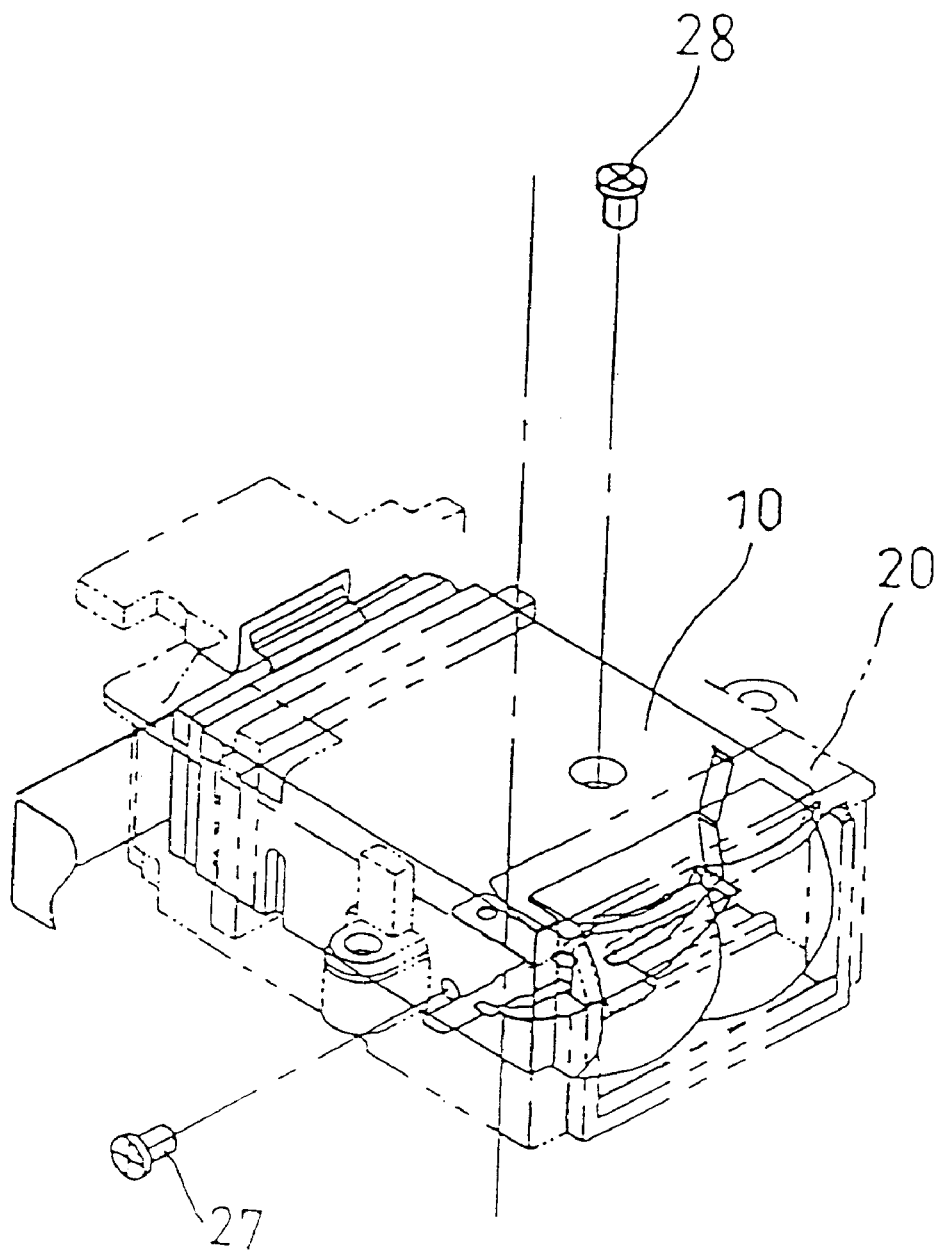
FIG. 2 is a perspective view of the assembled condition of the device.
Figure 3:
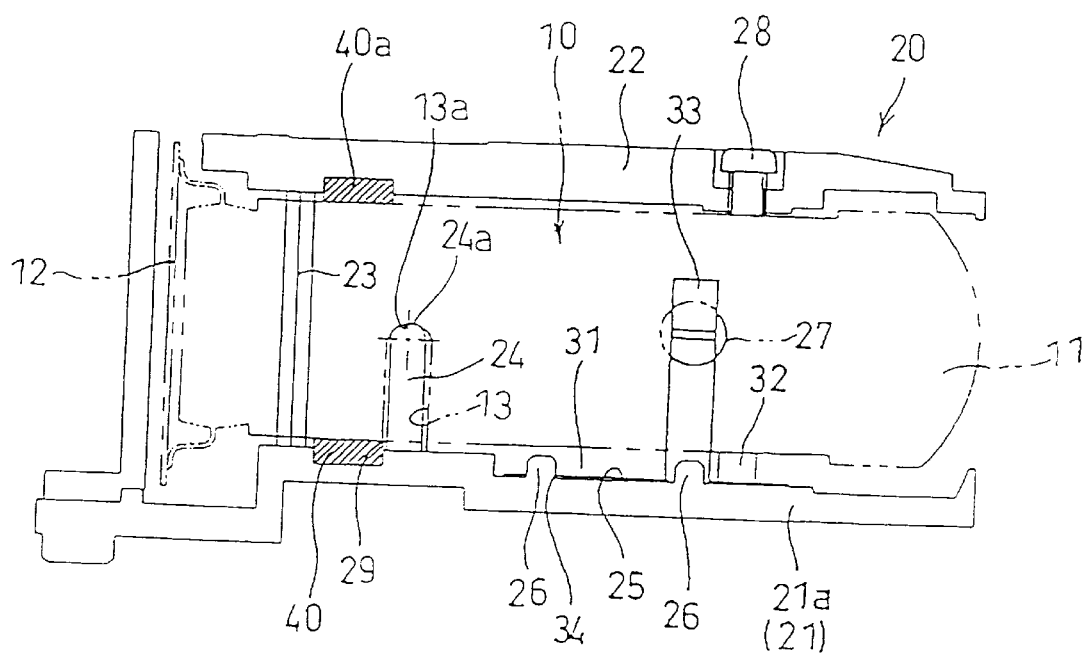
FIG. 3 is a vertically cross sectional view of the device.

A position adjusting device for a camera optical unit will be described in detail with reference to an illustrated example in which an AF ranging unit 10 of a passive type is installed in a casing 20. The AF ranging unit 10 is provided at its front part with a pair of field lenses 11 distanced from each other by a length of a basic line. Lights from a subject enter the unit 10 through the pair of lenses to form respective images of the subject on a line sensor. The unit 10 electrically compares positions of images of the subject on the line sensor, and thereby calculates a distance to the subject. The AF ranging unit 10 of this type is known and commercially available. The line sensor of the unit 10 is provided on an FPC substrate secured to a rear end of the unit 10 opposite from the field lenses 11.

A casing 20 for housing this AF ranging unit 10 is made up of a main frame body 21 of U shape in cross section having a bottom wall 21a and both side walls 21b, and a cover body 22 for closing an opening part 21c at an upper side of the main frame body 21. The casing 20 has a parallelpiped outer configuration slightly larger than the AF ranging unit 10. The main frame body 21 is opened at its front end and provided at its rear end with a rear wall 21d. A drawing groove 21e for the FPC substrate is formed between the rear wall 21d and the one of the side walls 21b.

The main frame body 21 is formed with a pair of protruding knife edges 23 (only one knife edge 23 is shown in FIG. 1), which elongate in a vertical direction and protrude inwardly from respective side walls 21b. The edges 23 are located closer to the rear wall 21d than to the opened front end, and serve as a support for a lateral pivotal movement of the unit 10 with respect to the casing 20. A pair of projections 24 (onlyoneprojection24 is shown in FIG. 1) are formed in front of the edges 23 to elongate in the vertical direction. The projections 24 define round faces 24a at their upper ends, and serve as a support for a vertical pivotal movement of the unit 10 with respect to the casing 20.

Correspondingly, the AF ranging unit 10 has a pair of vertical grooves 13 (one of them is shown in FIG. 1) in respective sides thereof for mating with the pair of vertical projections 24. The upper ends of the vertical grooves 13 are formed into inner cylindrical faces 13a (one is shown in FIG. 1) to receive the round faces 24a of the vertical projections 24. Preferably, the inner cylindrical faces 13a are positioned at almost center in the height of the AF ranging unit 10 (line sensor). The width of the vertical groove 13 is larger than the width of the projection 24 to such a degree as to permit the AF ranging unit 10 pivotally move vertically, and the groove 13 is formed more deeply than the projecting amount of the projection 24 to such a degree as to permit the AF ranging unit 10 pivotally move laterally around either one of the knife edges 23 or a lateral center on a line connecting the-knife edges 23 (apexes of the knife edges 23). In FIG. 1, reference numeral 14 designates a contact line through which the AF ranging unit 10 is contacted with the knife edge 23.

The main frame body 21 has housing grooves 25 and positioning projections 26, which cooperatively hold a single plate spring member 30 on the inside of the bottom wall 21a. The housing grooves 25 is conformed in shape with the plate spring member 30. The plate spring member 30 has a base part 31 in the form of a cross, a pair of vertically pressing pieces 32 extending laterally in opposite directions from a front end of the base part 31 and bent upward at their lateral ends, and a laterally pressing piece 33 bent upward from one of left and right ends of the base part 31. The laterally pressing piece 33 is bent inward at its middle portion. The base part 31 is formed with positioning holes 34.

The housing grooves 25 in the bottom wall 21a of the main frame body 21 are conformed in shape with the base part 31, vertical pressing piece 32 and laterally pressing piece 33 of the plate spring member 30, and the positioning projections 26 are fitted in the positioning holes 34. A groove is formed in the side wall 21b to receive the laterally pressing piece 33. In the interior of the main frame body 21, an insertion groove 29 is formed between the knife edge 23 and the vertical projection 24 to receive a light shielding member 40.

An adjusting screw 27 is threadingly engaged with the side wall 21b of the main fame body 21 of the casing 20 so as to correspond in location to the laterally pressing piece 33 of the plate spring member 30. Another screw 28 is threadingly engaged with the cover 22 so as to correspond in location to the vertically pressing piece 32 of the plate spring member 30.

In addition, it is preferable that the edges 23 and the projections 24 are distanced from the laterally and vertically pressing pieces 33 and 32 in a back-and-forth direction as illustrated.

The position adjusting device is assembled as follows:

The plate spring member 30 is set in the housing grooves 25 of the bottom wall 21a of the main frame body 21 so that the positioning projections 26 are fitted in the positioning holes 34.

The outer circumference of the AF ranging unit 10 with the exception of its upper surface is wrapped by the elastic light shielding member 40 made, for instance, of molt plane, so that the light shielding member 40 presents a U-shape form between the vertical grooves 13 and the knife edge contact lines 14. This AF ranging unit 10 is placed in the main frame body 21 such that the right and left vertical grooves 13 are fitted on the vertical projections 24, the FPC substrate 12 is drawn out from the main body frame 21 through the drawing groove 21e, and the field lenses 11 are confronted with the opened front end. The light shielding member 40 is fitted in the insertion groove 29. Under this condition, the cover body 22 is placed and retained on the main frame body 21 using fixing screw seats 22a and 21f so that a light shielding member 40a provided on the cover body 22 is contiguous with the light shielding member 40. In this manner, the casing 20 is temporarily assembled. In the casing 20 thus temporality assembled, the vertically pressing pieces 32 of the plate spring 30 biases the AF ranging unit 10 upwardly, and the laterally pressing piece 33 thereof biases the AF ranging unit 10 laterally (in the leftward direction in FIG. 1). The light shielding members 40 and 40a circumscribe the outer circumference of the AF ranging unit 10 while being slightly compressed to avoid the leakage light from entering through a clearance between the unit 10 and the casing 20. The casing 20 thus temporarily assembled is fixed to a camera body. Under the condition in which the casing 20 is fixed to the camera body, the positional adjustment for the AF ranging unit 10 can be carried out as follows:

The lateral position 6f the AF ranging unit 10 can be adjusted by changing the threading amount of the adjusting screw 27 into the main frame body 21, and the vertical position of the unit 10 can be adjusted by changing the threading amount of the adjusting screw 28 into the cover body 22. That is, the AF ranging unit 10 is biased laterally by the laterally pressing piece 33 of the plate spring member 30, and the adjusting screw 27 regulates the lateral position of the unit 10 against the biasing force of the pressing piece 33. Thus, depending on the threading amount of the adjusting screw 27 into the main frame body 21, the AF ranging unit 10 is pivotably moved laterally around the knife edges 23 of the main frame body 21 for the lateral adjustment of the AF ranging unit 10 (the optical axes of the AF ranging unit 10). Further, the unit 10 is biased vertically by the vertically pressing pieces 32 of the plate spring member 30, and the adjusting screw 28 regulates the vertical position of the unit 10 against the biasing force of the pressing piece 32. Thus, depending on the threading amount of the adjusting screw 28 into the main frame body 22, the AF ranging unit 10 is pivotably moved vertically around the round faces 24a of the vertically pressing projections 24 for the vertical adjustment of the AF ranging unit 10 (the optical axes of the AF ranging unit 10).

Accordingly, the position adjusting device for the AF ranging unit 10 is simply constructed by the single plate spring member 30 and the adjusting screws 27 and 28 to reduce the number of parts and the entire size. The shielding members 40 and 40a are wrapped around the unit 10 between the knife edges 23 and the vertical projections 24, and therefore, the vertical and lateral adjustment for the unit 10 does not cause the substantive variation in compression amount. Thus, the shielding members 40 and 40a can be ensured before and after the adjustment.

What is claimed is:

1. A position adjusting device for a camera optical unit, said device comprising:
   a casing, to be fixed within the camera, for accommodating the optical unit therein;
   first and second supports, provided between the casing and the optical unit, for vertical and lateral pivotal movement of the optical unit with respect to the casing;
   a one-piece plate spring member having an integral laterally pressing piece for biasing the optical unit laterally and an integral vertically pressing piece for biasing the optical unit vertically; and a
   pair of adjusting threads, threadingly engaged with the casing, for regulating vertical and lateral positions of the optical unit against biasing forces of the vertically and laterally pressing pieces.

2. The device as set forth in claim 1, wherein an elastic shielding member interposed in a clearance between the casing and the optical unit.

3. The device as set forth in claim 2, wherein the shielding member is provided between the first and second supports.

4. The device as set forth in claim 1, wherein the plate spring member has a base part positioned on a bottom wall of the casing, the vertically pressing pieces, extending laterally from the base part, for biasing the optical unit vertically, and the laterally pressing piece, extending vertically from the base part, for biasing the optical unit laterally.

5. The device as set forth in claim 1, wherein the optical unit includes a passive AF ranging unit.

6. the device as set forth in claim 1, wherein the first and second supports are positioned along a length of said casing and spaced from the vertically and laterally pressing pieces.

7. The device as set forth in claim 1, wherein the threads are respectively located opposite from the vertically and laterally pressing pieces with respect to the optical unit.

* * * * *